(12) United States Patent
Knutson et al.

(10) Patent No.: US 8,687,747 B2
(45) Date of Patent: Apr. 1, 2014

(54) METHOD AND APPARATUS FOR SYMBOL TIMING RECOVERY

(75) Inventors: Paul Gothard Knutson, Lawrenceville, NJ (US); Dirk Schmitt, Villingen, DE (US); Wen Gao, West Windsor, NJ (US)

(73) Assignee: Thomson Licensing, Issy le Moulineaux (FR)

( * ) Notice: Subject to any disclaimer, the term of this patent is extended or adjusted under 35 U.S.C. 154(b) by 211 days.

(21) Appl. No.: 13/320,128

(22) PCT Filed: May 28, 2010

(86) PCT No.: PCT/US2010/001570
§ 371 (c)(1),
(2), (4) Date: Nov. 11, 2011

(87) PCT Pub. No.: WO2010/138199
PCT Pub. Date: Dec. 2, 2010

(65) Prior Publication Data
US 2012/0057664 A1    Mar. 8, 2012

Related U.S. Application Data

(60) Provisional application No. 61/217,333, filed on May 29, 2009.

(51) Int. Cl.
*H03D 1/00* (2006.01)
*H04L 27/06* (2006.01)

(52) U.S. Cl.
USPC ........................................................ 375/343

(58) Field of Classification Search
USPC ........................................................ 375/343
See application file for complete search history.

(56) References Cited

U.S. PATENT DOCUMENTS 6,647,074 B2 * 11/2003 Citta et al. ................... 375/298
8,472,570 B2 *  6/2013 Alexander et al. ............ 375/343

(Continued)

FOREIGN PATENT DOCUMENTS

EP        1237319 A1    9/2002

OTHER PUBLICATIONS

Gardner, "A BPSK/QPSK Timing-Error Detector for Sampled Receivers", IEEE Transactions on Communications, vol. COM-34, No. 5, May 1986, pp. 423-429.

(Continued)

*Primary Examiner* — Erin File
(74) *Attorney, Agent, or Firm* — Robert D. Shedd; Jeffrey M. Navon

(57) ABSTRACT

Methods and apparatus for symbol timing recovery are provided. Both a coarse symbol timing recovery method and apparatus, and a fine symbol timing recovery method and apparatus are described which can be used jointly for symbol recovery, for example in phase shift keying receivers. The coarse method involves the use of differential correlations and finding the time difference in peak values of the correlation results. The fine method involves interpolation of a received digital signal, followed by filtering and timing error detection. The error detection signal is further filtered and used to control the interpolator. The methods provide for robust symbol timing synchronization.

16 Claims, 19 Drawing Sheets

(56) References Cited

U.S. PATENT DOCUMENTS

| | | | |
|---|---|---|---|
| 2003/0016773 A1* | 1/2003 | Atungsiri et al. | 375/355 |
| 2004/0223554 A1 | 11/2004 | Cha | |
| 2005/0100118 A1* | 5/2005 | Zhang | 375/343 |
| 2007/0019767 A1* | 1/2007 | Buda et al. | 375/355 |
| 2007/0030797 A1 | 2/2007 | Baek | |
| 2009/0135977 A1* | 5/2009 | Sheu | 375/371 |
| 2010/0142632 A1* | 6/2010 | Koo et al. | 375/260 |
| 2012/0287846 A1* | 11/2012 | Becker et al. | 370/315 |

OTHER PUBLICATIONS

Mueller et al., "Timing Recovery in Digital Synchronous Data Receivers", IEEE Transactions on Communications, vol. 24, No. 5, May 1, 1976, pp. 516-531.
Lee et al., "Robust Frame Synchronization for Low Signal-to-Noise Ratio Channels Using Energy-Corrected Differential Correlation", EURASIP Journal on Wireless Communications and Ntworking, vol. 2009 (2009), Article ID 345989, 2009, 8 pages.
International Search Report dated Jan. 28, 2011.

* cited by examiner

1900

METHOD AND APPARATUS FOR SYMBOL TIMING RECOVERY

CROSS-REFERENCE TO RELATED APPLICATIONS

This application claims the benefit, under 35 U.S.C. §365 of International Application PCT/US2010/001570, filed May 28, 2010, which was published in accordance with PCT Article 21(2) on Dec. 2, 2010 in English and which claims the benefit of U.S. provisional application No. 61/217,333, filed May 29, 2009.

FIELD OF THE INVENTION

The present principles relate to course and fine symbol timing recovery in phase shift keying systems.

BACKGROUND OF THE INVENTION

Digital Video Broadcasting has developed digital broadcast standards for cable, terrestrial, and satellite transmission. In 2003, the second generation digital video broadcasting standard for satellite transmission (DVB-S2) was developed and ratified by the European Telecommunications Standards Institute (ETSI). One of the features of the DVB-S2 standard is backward compatibility with DVB-S, the first generation standard. DVB-S2 also includes adaptive coding and modulation, LDPC coding together with an outer BCH code, and several coding rates. A further feature is four modulation modes (QPSK, 8PSK, 16APSK, and 32APSK). Future generations of the standards may expand on these key features and it is conceivable that backward compatibility will be included.

Normally, symbol timing recovery (STR) is done before the phase and frequency offset of the carrier is recovered using a feedback STR loop. Due to the problem of phase margin loss caused by delay in the STR loop, the error estimation of the symbol timing recovery is normally done before the matched filter in the receiver to minimize delay in the loop. For pulse shaping it is a common practice to use root raised cosine (RRC) filter to shape the transmitted pulse. This causes intersymbol interference (ISI) in the received signal before the matched filter, since an RRC pulse is not in the class of Nyquist impulses. As the roll-off factor decreases, the ISI gets more severe, and the acquisition range or pull-in of the feedback solution decreases.

Another problem arises for faster than Nyquist (FTN) signaling, where the pulse shaped symbols are shifted in time closer together. FTN will become a major topic in the coming years since bandwidth is limited and FTN provides another dimension in receiver design besides the usual bandwidth and excess bandwidth for a given SNR and bit error rate. FTN, by using information pulses on a temporally compressed timing grid, causes a huge amount of ISI and the classical timing recovery based on the feedback solution fails for large timing offsets. The coarse symbol timing recovery method described herein solves the problem of decreasing acquisition range as ISI gets more severe and provides a very robust recovery method, even to the ISI caused by FTN transmission.

Timing offset estimation in satellite receivers is normally done using a classical feedback solution with a Gardner timing error detector. Other solutions are also known, like the M&M detector, which uses post matched filtered samples and which is more insensitive to ISI but is very sensitive to phase and frequency errors.

The coarse outer timing estimate can be followed by a loop for fine symbol timing recovery, or each idea may be implemented separately.

The fine symbol timing recovery methods discussed herein help the symbol timing recovery system lock under adverse conditions, including low SNR, low excess bandwidth, and when faster than Nyquist (FTN) signaling is used. To squeeze more capacity from existing satellite channels, new methods are being explored to fit more data into the available bandwidth, such as reducing excess bandwidth, using faster than Nyquist signaling, and operating at lower SNR thresholds. Each of these approaches creates difficulties in symbol timing recovery. Symbol timing recovery was one of the limiting factors to the adoption of these capacity enhancing options.

These problems and others are addressed by the principles of the present invention in which a coarse and a fine symbol timing recovery scheme are presented. A novel symbol timing offset detection algorithm for data aided symbol timing estimation is used for coarse timing adjustment using pre-known data embedded in a DVB-S2 like transmission stream, which may be followed by a method for fine symbol timing recovery. Feed forward recovery relies on pre-known data symbols (e.g. pilot or sync symbols) embedded in the data stream. The coarse timing recovery idea described herein solves the problem of a traditional feeback approach of decreasing acquisition range as ISI gets more severe. It achieves this solution by using a data aided feed forward symbol timing recovery method that provides a very robust recovery method, even to the ISI caused by FTN transmission.

One advantage of the proposed coarse symbol timing offset detector presented herein is insensitivity to phase and frequency offsets and ISI. The proposed method uses pre-known data in the DVB-S2-like transmission stream to estimate the timing offset when a classical timing recovery scheme using feedback is not applicable due to large ISI. The proposed detector relies on pre-known symbols, but for modern communications designs, Turbo-codes, or LDPC codes with large frame length, are used which makes the insertion of pre-known symbols for frame synchronization mandatory. Also, for operation in low SNR, additional pilot information is often added to a signal to aid in demodulation.

The fine symbol timing recovery methods discussed herein help the symbol timing recovery system achieve and maintain lock under adverse conditions, including those used to increase the channel capacity of satellite channels, such as operating a lower SNR thresholds, reducing excess bandwidth, and when faster than Nyquist (FTN) signaling is used, which often make symbol timing recovery difficult.

SUMMARY OF THE INVENTION

These and other drawbacks and disadvantages of the prior art are addressed by the present principles, which are directed to a method and apparatus for symbol timing recovery.

According to an aspect of the present principles, there is provided a method for symbol timing recovery. The method comprises the steps of performing one or more differential correlation operations, measuring a time difference between peak values of the correlation result, using this time difference as an estimate of symbol timing offset to determine coarse symbol timing and receiving further digital signals using the coarse symbol timing.

According to another aspect of the present principles, there is provided an apparatus for symbol timing recovery. The apparatus comprises a processing circuit for performing the one or more differential correlation operations, time difference measurement circuitry for measuring the time difference between correlation peaks, a timing error detector for determining a coarse symbol timing and a receiver for receiving further digital signals using the coarse symbol timing.

According to another aspect of the present principles, there is provided another method for symbol timing recovery. The method comprises interpolating a received digital signal through control of a numerically controlled delay, filtering the interpolated result using at least one of a matched filter or a second filter, and using the result to find the timing error for fine symbol timing, which is then filtered and used by the numerically controlled delay for fine symbol timing.

According to another aspect of the present principles, there is provided another apparatus for symbol timing recovery. The apparatus comprises an interpolator for interpolating a received digital signal, wherein interpolating is controlled by a numerically controlled delay, a loop filter for filtering a time difference signal, a controller for controlling the numerically controlled delay using output of the loop filter, another filter for filtering the interpolated output using at least one of a matched filter or a second filter, wherein the second filter can also be a matched filter, a timing error detector for using the time difference signal as an estimate of symbol timing offset to determine symbol timing, and a receiver for receiving a further digital signal using the fine symbol timing.

According to another aspect of the present principles, there is provided another method for symbol timing recovery. The method comprises performing one or more differential correlation operations on a received signal, measuring a time difference between peak values of the correlation function, using the time difference as an estimate of symbol timing offset to determine a coarse symbol timing, using said coarse symbol timing to receive a further digital signal, interpolating further received digital signal, wherein interpolating is controlled by a numerically controlled delay, filtering a timing error detection signal with a loop filter, controlling the numerically controlled delay using output of said loop filter, filtering of the interpolated output using at least one of a matched filter or a second filter, wherein the second filter can also be a matched filter, finding the timing error of the filtered interpolated signal as a further estimate of symbol timing offset to determine a fine symbol timing, and using said fine symbol timing to receive a subsequent digital signal.

According to another aspect of the present principles, there is provided another apparatus for symbol timing recovery. The apparatus comprises a processing circuit for performing one or more differential correlation operations on a received signal, circuitry for measuring a time difference between peak values of the correlation function, a timing error detector for determining coarse symbol timing using the time difference as an estimate of symbol timing offset, a receiver for receiving a further digital signal using said coarse symbol timing, an interpolator for interpolating said further received digital signal, wherein interpolating is controlled by a numerically controlled delay, a loop filter for filtering a time difference signal, a controller for controlling the numerically controlled delay using output of said loop filter, a filter for filtering the interpolated output using at least one of a matched filter or a second filter, wherein the second filter can also be a matched filter, a timing error detector for calculating the timing error of the filtered interpolated signal as an estimate of symbol timing offset to determine the symbol timing, and a receiver for receiving a subsequent digital signal using said fine symbol timing.

These and other aspects, features and advantages of the present principles will become apparent from the following detailed description of exemplary embodiments, which is to be read in connection with the accompanying drawings.

DETAILED DESCRIPTION

Figure 6:
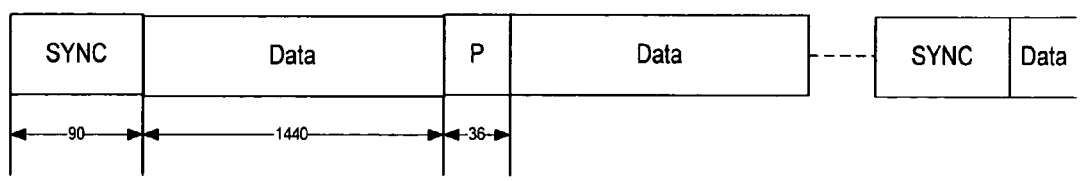
FIG. 6 shows the DVB-S2 frame structure, sync, and pilot information.

The coarse symbol timing offset estimator presented herein improves the symbol timing recovery operation by using a two step approach with two different timing offset detectors. In the first step, the timing offset is estimated by using pre-known symbols, SYNC symbols in the DVB-S2 like frame structure given in FIG. 6. The SYNC symbols are built by pi/2 BPSK modulation. The most important advantage of the differential correlation in the receiver is the robustness against phase and frequency offset errors of the carrier. As the phase and frequency carrier offset compensation could be done after the timing is locked, in this case the differential correlation receiver is very suitable for satellite receiver design. Using the principles of the present invention, the differential correlation is improved using a $T_s$ spaced double correlation, wherein $T_s$ indicates the sample interval of an ADC. Furthermore the $T_s$ spaced double correlation is done twice. The first $T_s$ spaced double correlation block is fed using the matched filtered samples $v[n(T_s+T_{off})]$ and the second $T_s$ spaced double correlation block is fed with the $T_s/2$ shifted matched filter sample $v[n(T_s+T_{off})+T_s/2]$. The time constant $T_{off}$ indicates the timing offset which has to be estimated by the timing offset detector described herein. This modification could be done easily, as the Gardner TED already uses a two sample per symbol system. For the $T_s$ spaced differential correlation of the pre-known sync symbols $a[nT_{sym}]$ with the post matched filtered samples $y[nT_s]$, a computation of differential correlation references has to be done, whereas $a[nT_{sym}]$ indicates the pre-known 90 sync symbols of the DVB-S2 preamble. The two $T_{sym}$ spaced double correlation vectors $da_1$ and $da_2$ are then derived to build the reference for the later cross correlation as it is shown in equation (1), wherein $T_{sym}$ indicates the true symbol period.

$$da_1[nT_{sym}]=a[nT_{sym}]a^*[(n+1)T_{sym}] n\epsilon 0 \ldots N-2$$

$$da_2[nT_{sym}]=a[nT_{sym}]a^*[(n+2)T_{sym}] n\epsilon 0 \ldots N-3 \quad (1)$$

The matched filtered samples $y[nT_s]$ are then preprocessed by using a differential conjugate complex multiplier to derive the two $T_s$ spaced matched filtered differential signals, $dy_1$ and $dy_2$, as shown in equation (2).

$$dy_1=y[nT_s]y^*[(n+1)T_s]$$

$$dy_2=y[nT_s]y^*[(n+2)T_s] \quad (2)$$

Next, the two $T_s$ spaced differential signals $dy_1$ and $dy_2$ are convolved with the time reversed reference signals $da_1$ and $da_2$ to build the cross correlation between the differential reference and the differential matched filtered vectors. Equation 3 is then used to implement the cross correlation function, wherein $s_{mag}$ is the so-called sync peak at time $nT_s$.

$$s_{mag}[nT_s] = \left|\sum_{n=0}^{88} da_1[(88-n)T_{sym}]dy_1[T_s]\right| + \left|\sum_{n=0}^{87} da_2[(87-n)T_{sym}]dy_2[nT_s]\right| \quad (3)$$

Figure 1:
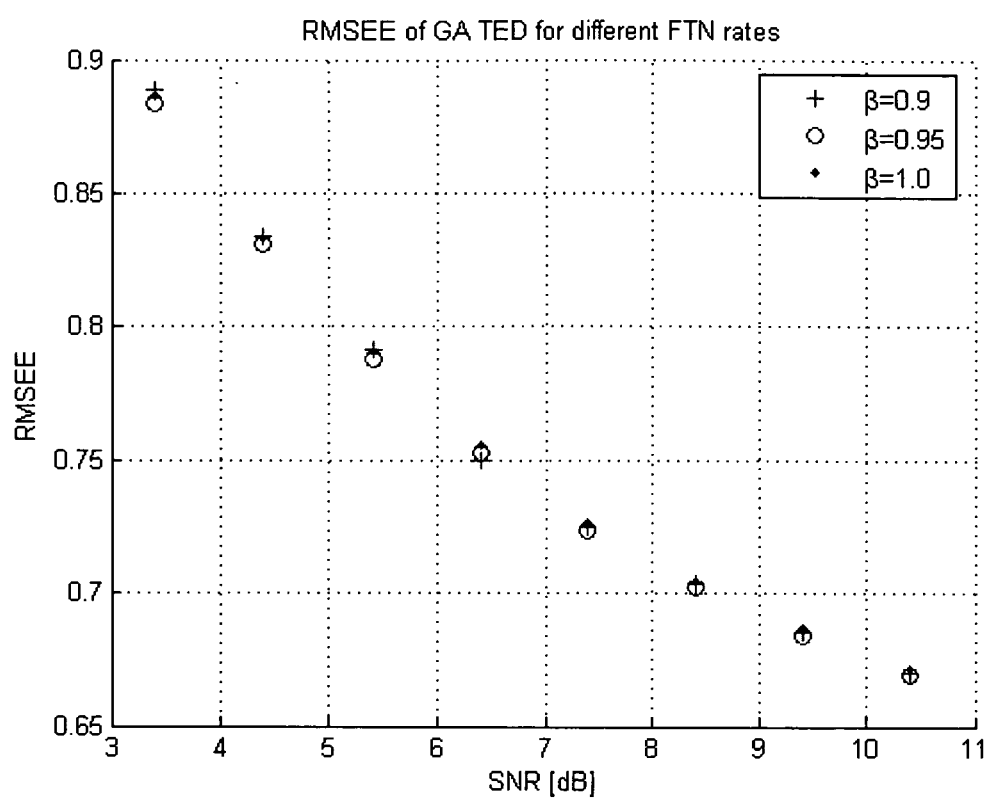
FIG. 1 shows the Root Mean Square Error of Estimation (RMSEE) of Gardner's timing error detection signal after matched filtering.
Figure 2:
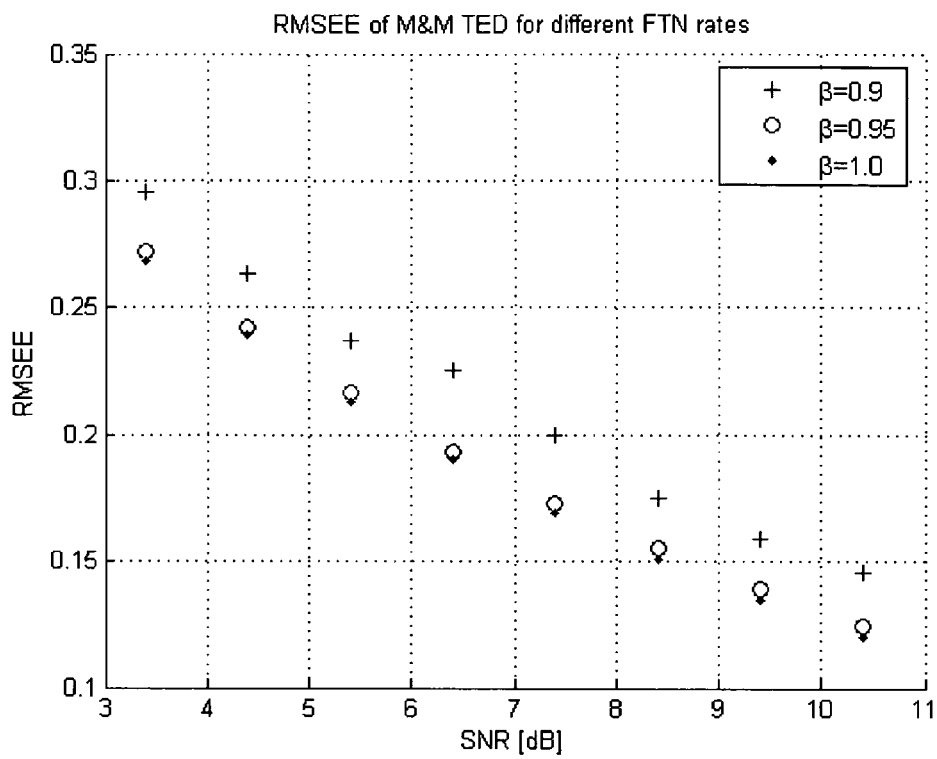
FIG. 2 shows the Root Mean Square Error of Estimation (RMSEE) of M&M timing error detection signal after matched filtering.
Figure 3:
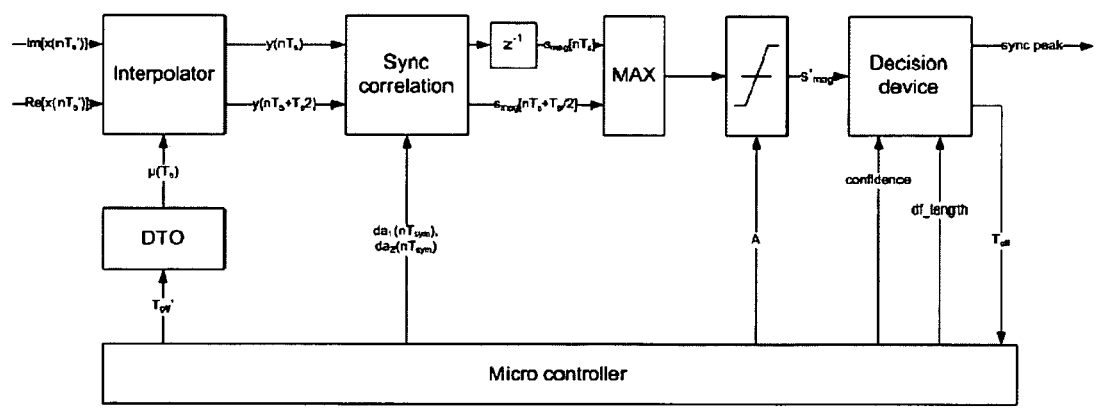
FIG. 3 shows one implementation of a coarse timing offset detector using $T_s$ spaced using the present principles.

As previously described, the $T_s$ spaced differential cross correlation is done twice on the matched filter output $y[n(T_s+T_{off})]$ and the $T_s/2$ shifted matched filter output $y[n(T_s+T_{off})+T_s/2]$ to detect a proper sync peak, forming $s_{mag}[n(T_s+T_{off})]$ and $s_{mag}[n(T_s+T_{off})+T_s/2]$, even if the optimum timing phase is moving relative to $T_{off}$ between two sync symbols. To select the correct sync peak output, a max device followed by a comparator are used to indicate the likelihood sync peak time location $s'_{mag}$. The comparator compares the incoming likelihood sync location against a threshold to indicate the sync peaks on the noise floor. The distance between two consecutive sync peaks is used to estimate the timing offset using the equation:

$$T_{off} = \frac{s'_{mag}(k-1) - s'_{mag}(k)}{dflength} f_s \quad (4)$$

where dflength indicates the data and sync field length, fs indicates the sampling rate, and s'mag is the most likelihood sync peak location. FIG. 3 shows one embodiment of the coarse timing offset detector. A first estimate of a timing offset, $T0_{off}$, is used to adjust the digital time oscillator (DTO, a.k.a. numerically controlled delay) to resample the down-converted signal $x(nT0_s)$ of the receiver. To simplify the discussion here, the interpolation filter and the matched filter are merged. The post matched filter samples $y(nT_s)$ are then passed through the timing offset detection device as described to build the two estimated sync locations $s0_{mag}[nT_s]$ and $s0_{mag}[nT_s+T_s/2]$. To avoid false alarms in the sync detection, a window of confidence around the expected sync peak separation is used to help verify synchronization. A confidence interval is used which indicates the limits of the distance between two syncs with [dflength−confidence, dflength+confidence].

Simulation Results

Figure 4:
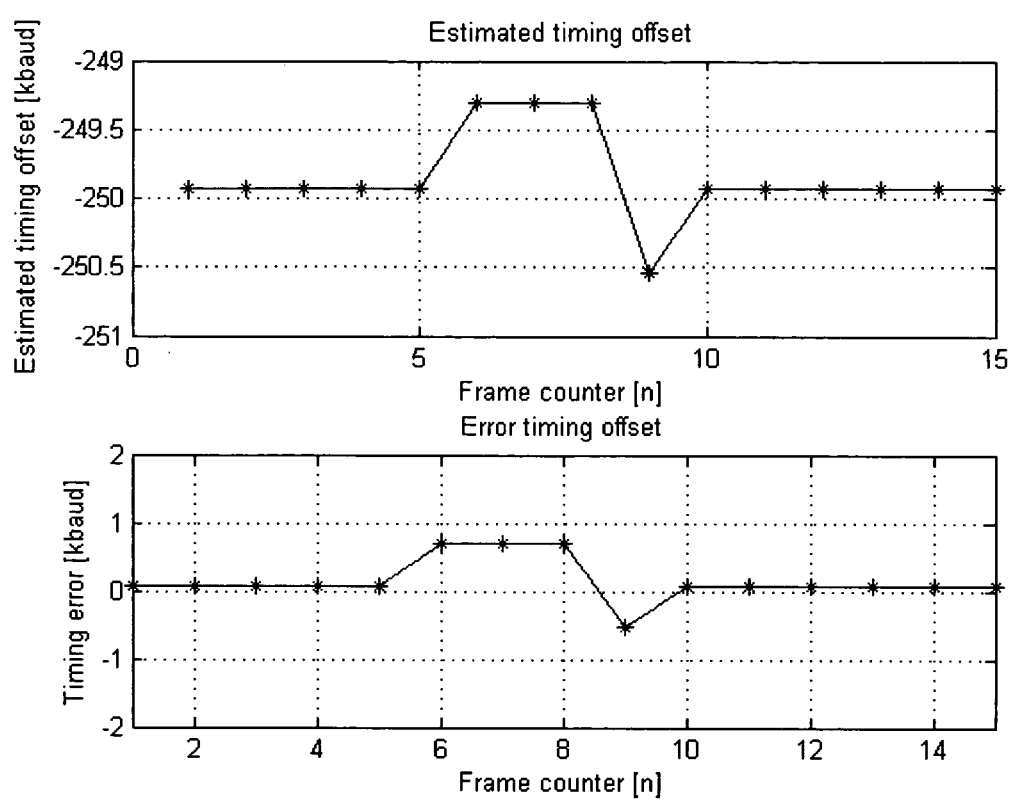
FIG. 4 shows the estimated timing offset $T_{off}$ for $\beta_1=0:9$ at 1 dB SNR.
Figure 5:
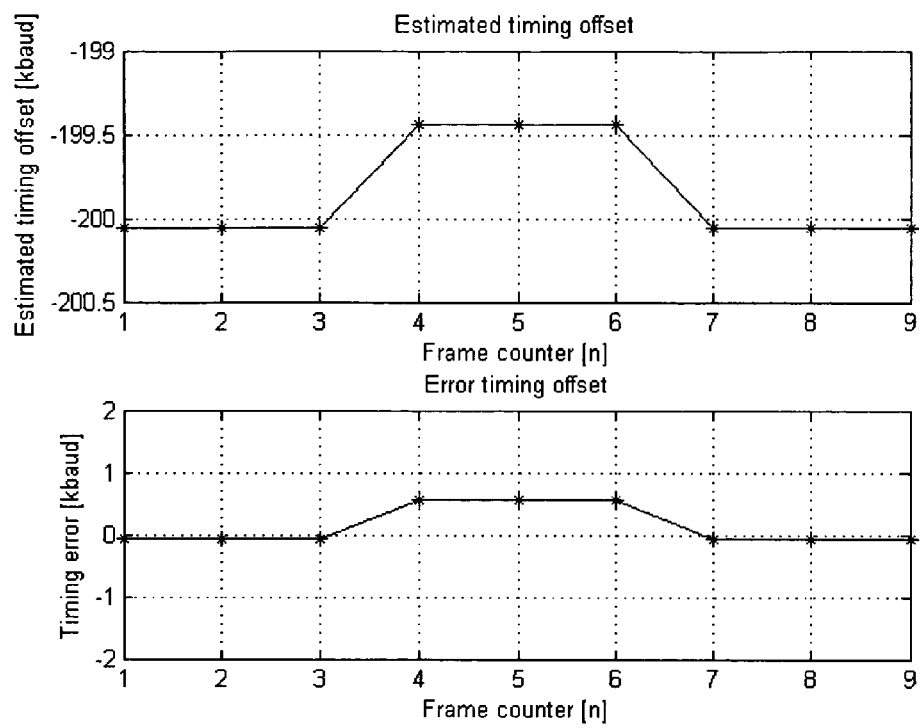
FIG. 5 shows the estimated timing offset $T_{off}$ for $\beta=0:8$ at 1 dB SNR.

For an example of the symbol timing offset estimation, a 20 MBaud QPSK stream sampled with slightly more than 2 samples per symbol is used, generated with the FTN rate $\beta1=0:9$ and $\beta2=0:8$. The confidence interval was symmetrically set to [31990,32990] around the nominal sync distance of dflength=32490 symbols. FIG. 4 shows that the timing offset 250 kBaud with the FTN rate $\beta1=0:9$ could be estimated very precisely even at the very low SNR level of 1 dB. In FIG. 5, the estimated timing offset $T_{off}$ at $\beta=0:8$ is shown. It can be seen that the timing offset with 200 kBaud of the 20 MBaud stream can be estimated by an error of only 0.5 kBaud which is sufficient to reduce the bandwidth for a following fine symbol timing recovery system to a very small value. Compared to a classical timing recovery based on the Gardner or M&M STR algorithms, this idea outperforms those approaches in both pull in range and lock stability.

This coarse STR system may be followed by a fine STR loop to track out residual timing offsets using traditional STR methods, such as Gardner, M&M or other algorithms. Gardner's approach is a method of timing error detection to use twice the symbol rate sample to estimate timing offset. Under the principles of the present invention, a symbol timing offset detection algorithm for data aided symbol timing estimation by using pre-known data embedded in a DVB-S2 like transmission stream can also be used. The following principles describe additional improvement to a fine STR loop design for low excess bandwidth and low SNR operation that may be used following the course loop. The proposed method and apparatus for fine loop design considers several factors to improve the performance of the STR function. The proposed fine loop may be augmented by a coarse outer timing estimate to expand the acquisition range and increase acquisition speed in practice.

Figure 7:
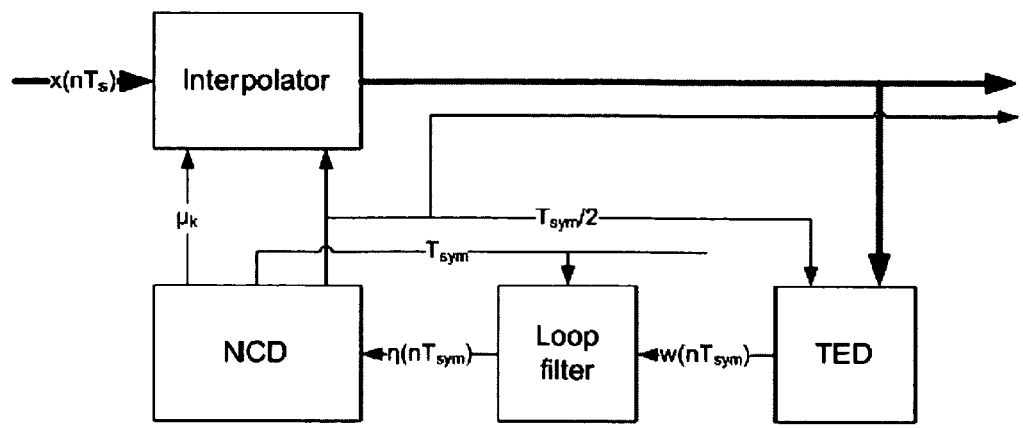
FIG. 7 shows a typical feedback timing recovery circuit.
Figure 8:
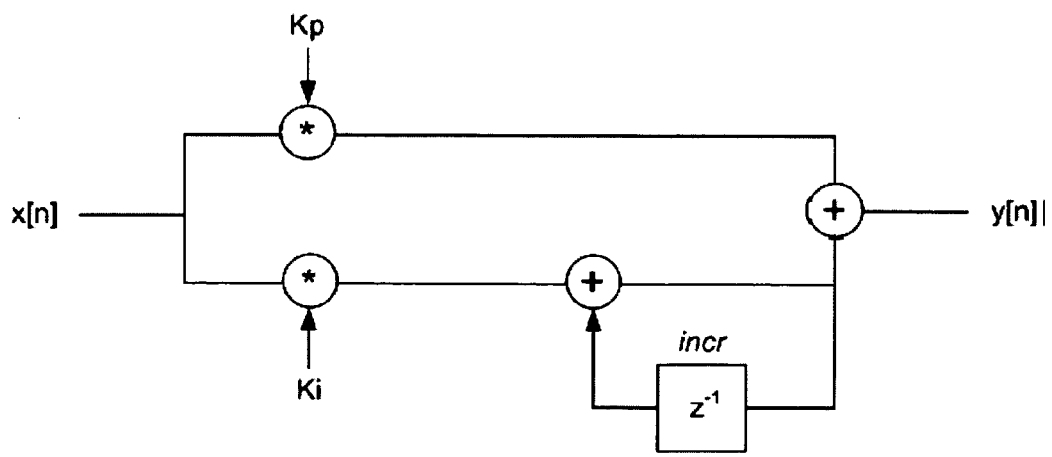
FIG. 8 shows a symbol timing recovery system loop filter.

FIG. 7 shows a typical symbol timing recovery loop. Signal X(nTs) is resampled by an interpolator, which is controlled by a numerically controlled delay (NCD), which in turn is controlled by the resampled output through a timing error detector (TED) filtered by the loop filter. nTs is the sample rate of the input signal, which is typically greater than Ts, the symbol rate. For example, n can be either slightly greater than 2, or slightly greater than 4, depending on whether the interpolator output is 2 or 4 samples per symbol. FIG. 8 illustrates a typical proportional-integral (PI) $2^{nd}$ order loop filter, typically employed in timing recovery loops.

Impairments in satellite systems are primarily AWGN and nonlinearity caused by satellite TWT amplifiers. Because of this channel, the traditional matched filter receiver architecture is ideal for satellite receivers.

Figure 9:
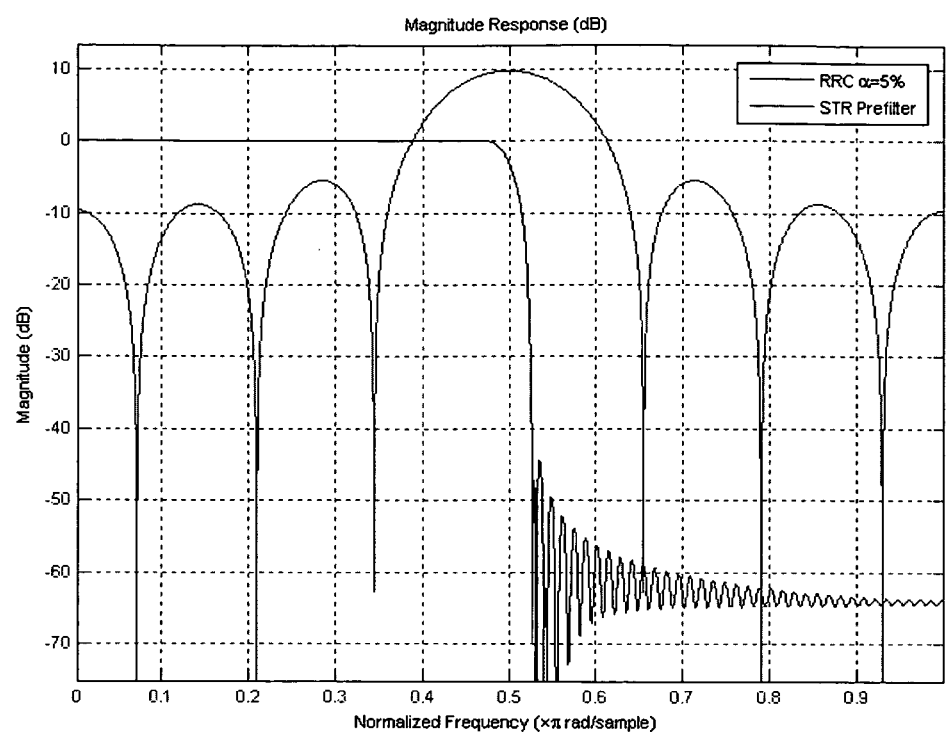
FIG. 9 shows frequency response of a symbol timing recovery prefilter and matched filter.
Figure 13:
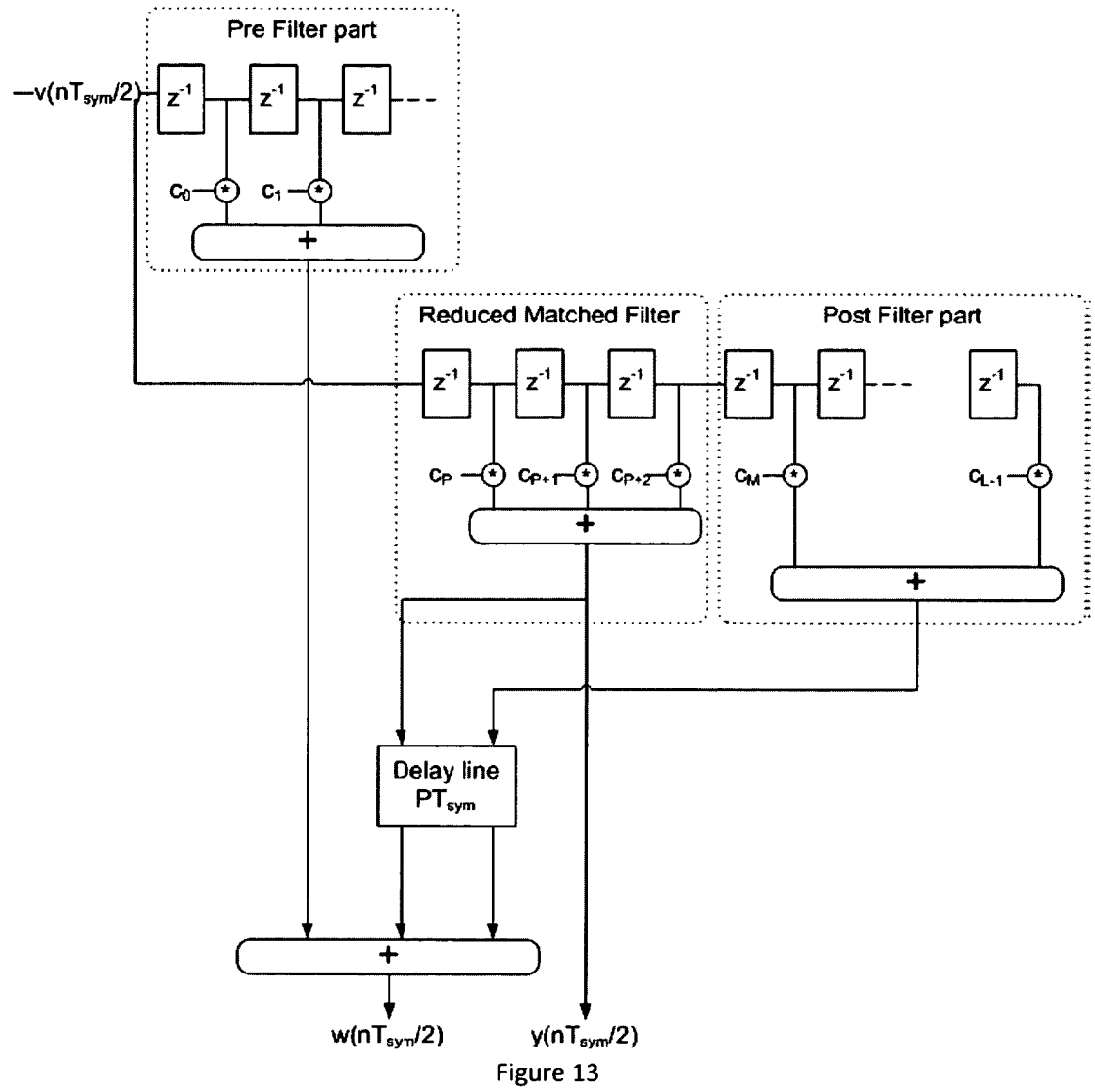
FIG. 13 shows one possible embodiment of a matched filter.

In the implementation of low excess bandwidth systems, the sharp rolloff of the pulse shaping filter requires a long impulse response, which greatly increases delay in the STR loop. Without the pulse shaping filter, ISI is greatly increased at low excess bandwidth. Both of these issues lead to acquisition problems in the STR loop. These problems are addressed in two ways. First, in acquisition, the matched filter is bypassed in the STR loop. A prefilter is added to the loop which emphasizes the band edge, which contains the timing information. This provides a twofold benefit—the narrowband timing signal is enhanced, while noise is reduced. When the loop is locked, further improvement is made by switching from the unfiltered interpolator output to the matched filter output. This attenuates noise from the out of band region, and greatly reduces ISI, giving better timing estimates. FIG. 9 shows an example of the frequency response of a prefilter and pulse shaping filter. A further embodiment of the principles described herein uses two matched filters—a full-length filter which accurately recovers the pulse train, and a truncated filter which improves the ISI problem with substantially less delay. This is beneficial in the low EB case, since ISI is severe without the matched filter. The short matched filter helps the loop by attenuating ISI, while not impairing the loop performance with large delays. A near minimum phase pulse shaping filter could also be used in an embodiment as the matched filter in the loop to reduce ISI and keep loop delay down. FIG. 13 illustrates one embodiment of a dual output matched filter, one path y with low delay, and the full path w with minimal ISI.

An additional improvement in the system results from gain switching. The loop filter gain is reduced, along with a reduction in bandwidth, once the timing loop has locked. While this does reduce the tracking capability of the loop, the satellite channel is quite stable with regard to timing. Once acquired, the timing is changed only by the drift of the local timing reference oscillator (typically a crystal), very slow Doppler drift (on geosynchronous satellites), and drift in the transmitter (almost none). Tracking bandwidth in the loop can be greatly reduced.

Figure 12:
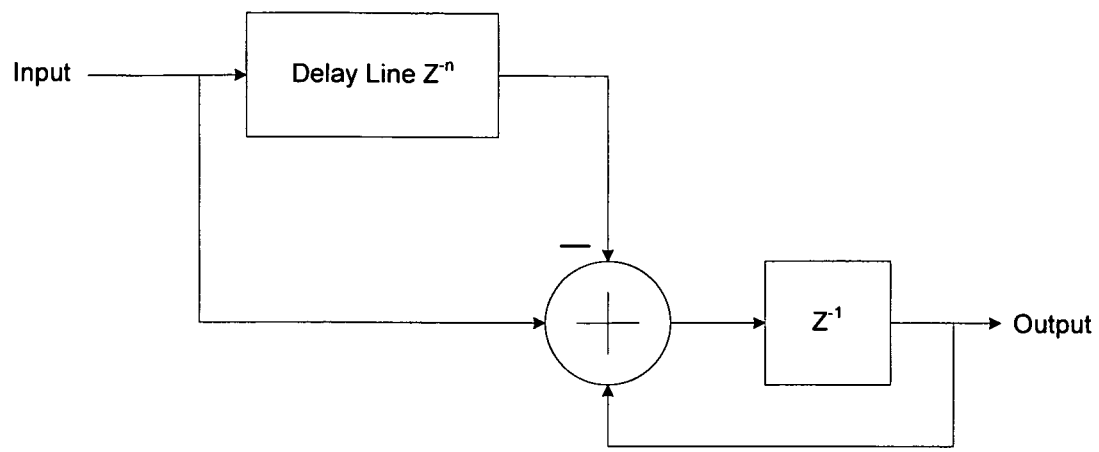
FIG. 12 shows an n-delay moving time average function.

An additional embodiment comprises the addition of a moving time average (MTA) filter after the timing error detector. While this could be done by further narrowing of the loop filter bandwidth, the FIR MTA filter is stable compared to the narrowband loop filter with poles practically on the unit circle. The MTA filter helps to remove jitter from the symbol timing loop. FIG. 12 illustrates one embodiment of the MTA filter.

Figure 10:
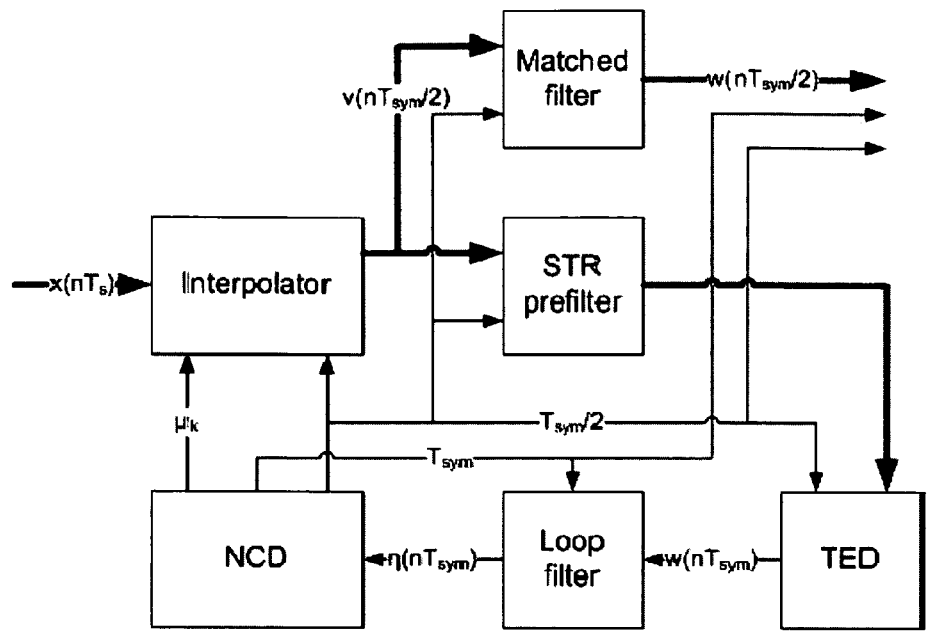
FIG. 10 shows the symbol timing recovery circuit of the present principles in acquisition mode.
Figure 11:
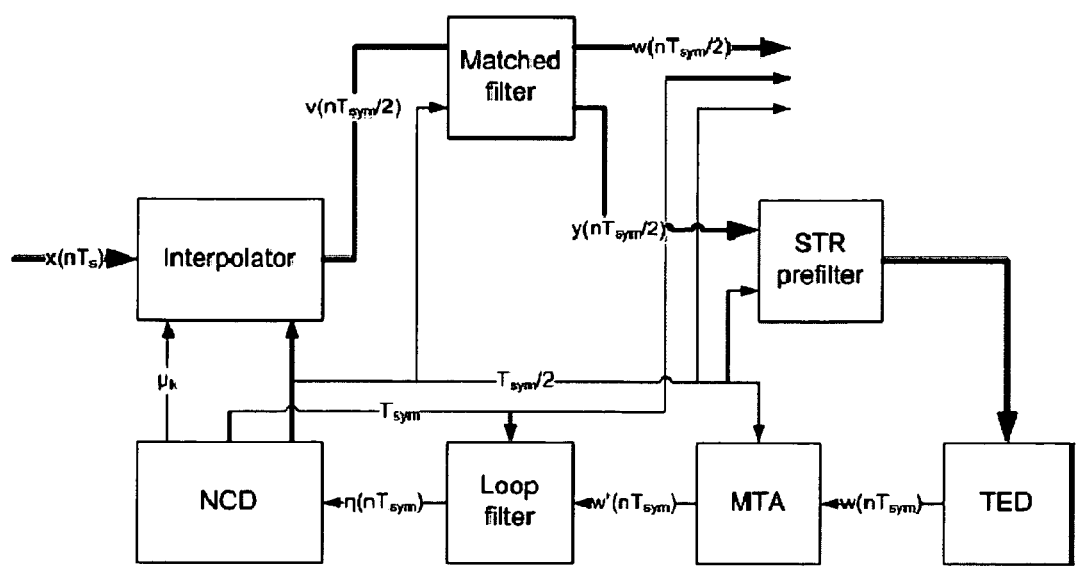
FIG. 11 shows the symbol timing recovery circuit of the present principles in tracking mode.

FIGS. 10 and 11 show the STR system in acquisition mode (FIG. 10) and tracking mode (FIG. 11). In practice, this transition would be performed with multiplexers and related design techniques, or could be implemented in a Digital Signal Processor. Loop filter parameters would also be changed in the transition from acquisition to tracking. Transition from acquisition to tracking is accomplished when a downstream receiver function indicates that the loops are locked, such as convergence of the LDPC decoder.

Figure 14:
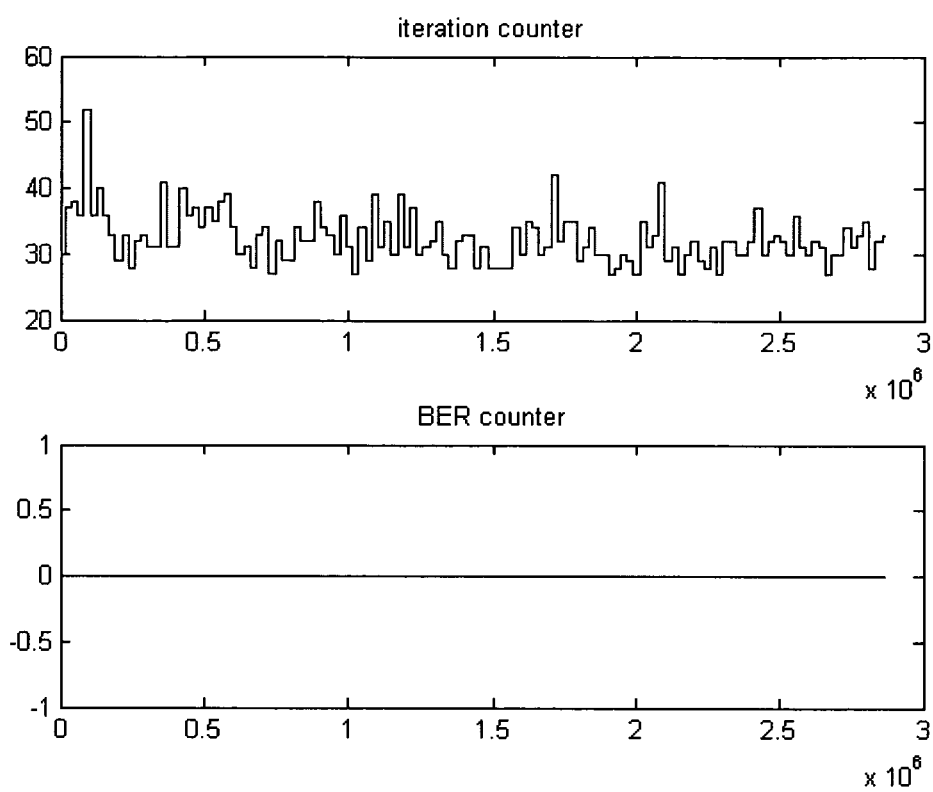
FIG. 14 shows graphs of an LDPC iteration counter value and a BER counter value.

An LDPC iteration counter is a rough estimate of the quality of the received signal. When the LDPC iteration counter indicates a value that is less than a prescribed number of iterations (63 in our example), the timing loop can be considered locked, and the loop switches to tracking mode. FIG. 14 shows the LDPC iteration counter and bit error rate count as a function of frame number when the receiver is properly locked.

Figure 15:
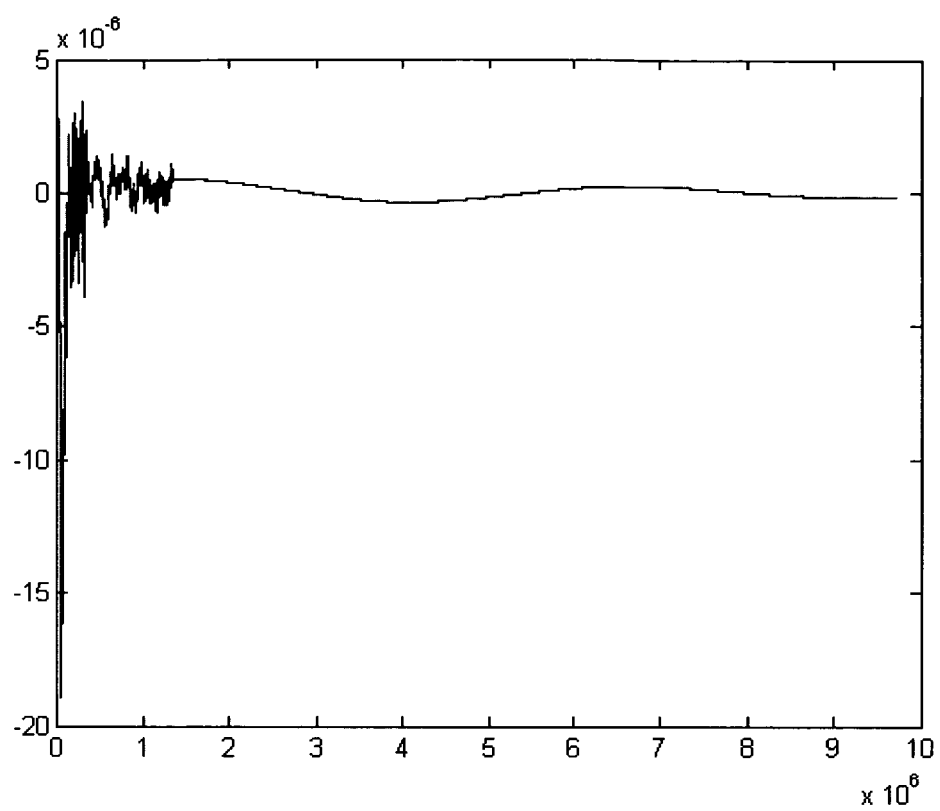
FIG. 15 shows the gain of a loop filter integrator with small integral gain.
Figure 16:
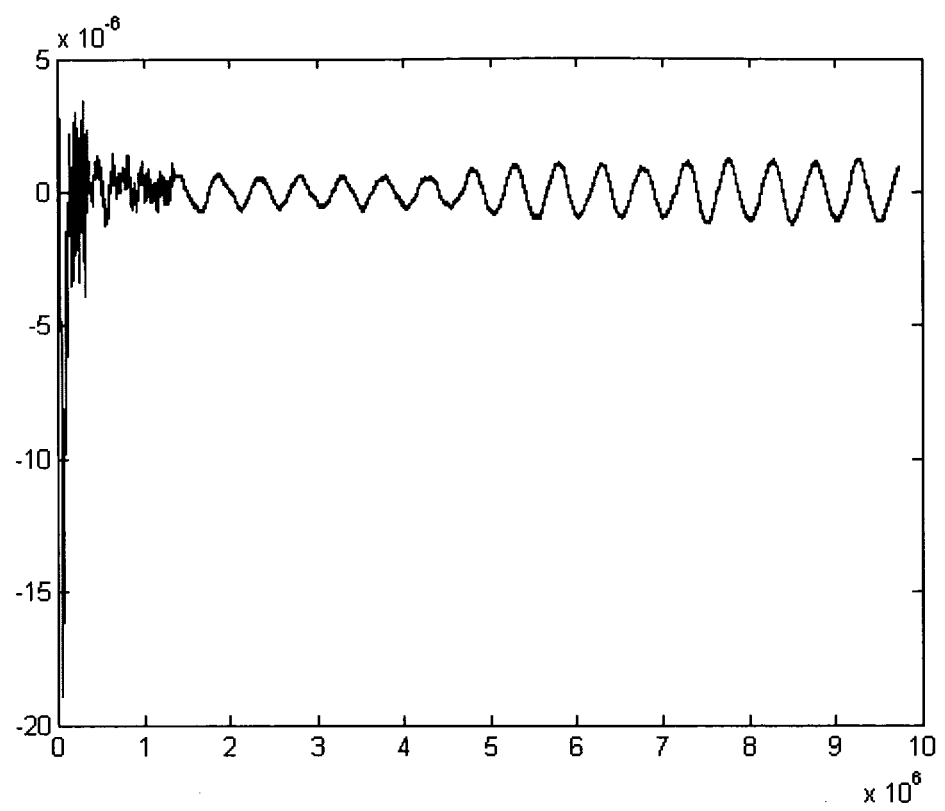
FIG. 16 shows the gain of a loop filter integrator with high integral gain.
Figure 17:
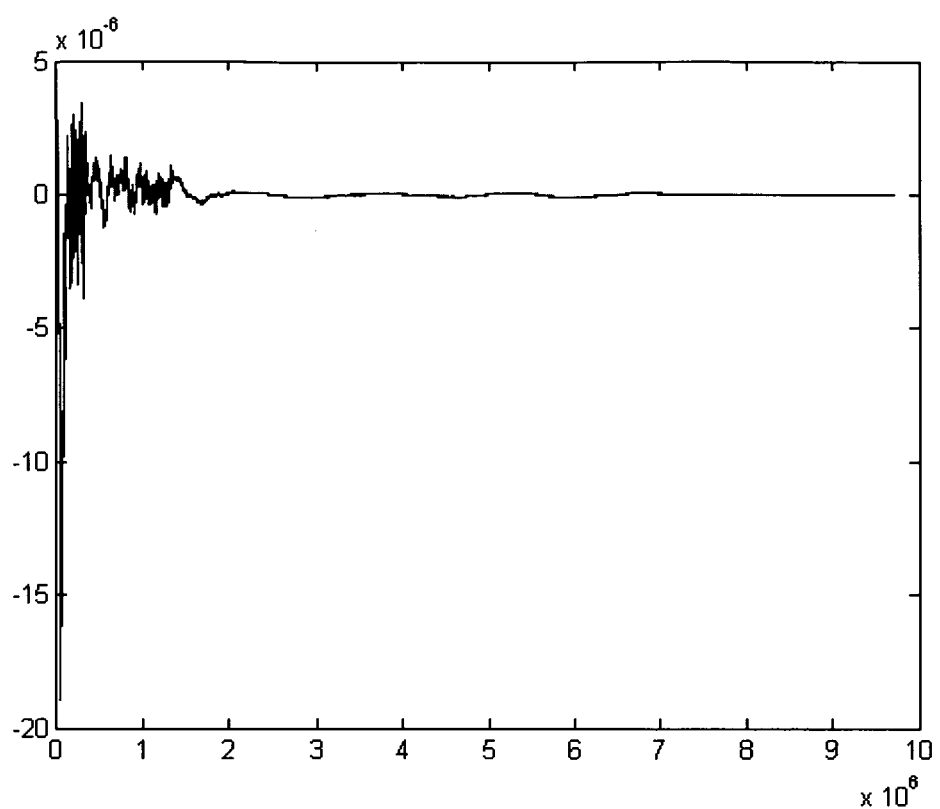
FIG. 17 shows a loop filter output with a 21-tap moving time average filter following the timing error detector.

The effect of the MTA change in loop filter parameters from acquisition to tracking is illustrated in FIGS. 15 and 16. FIG. 15 shows tracking mode with high integral gain, FIG. 16 shows tracking mode with low integral gain. The transition from acquisition to tracking mode occurs at about 1.4 million symbols. In tracking mode, there is an oscillation in the loop filter output, which will be translated into timing jitter in the interpolator. The inclusion of the MTA filter attenuates this jitter, allowing the STR loop to converge, as illustrated in FIG. 17.

Faster than Nyquist (FTN) signaling can also benefit from the techniques of the present invention, since jitter is increased by the ISI introduced in FTN signaling.

Figure 18:
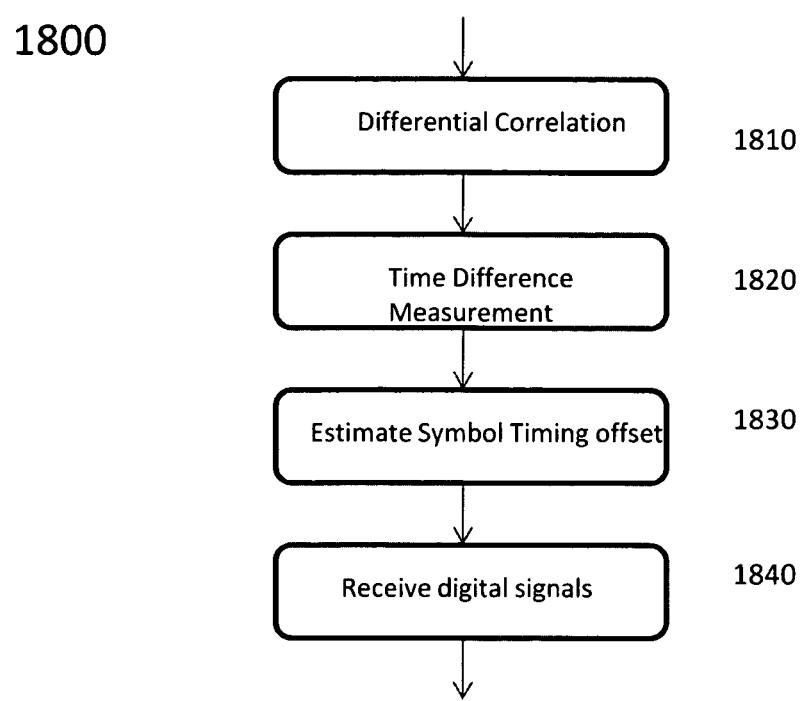
FIG. 18 shows a first exemplary method under the present principles.

One embodiment of the present principles is illustrated in FIG. 18, which shows a first exemplary method 1800 for symbol timing recovery. Differential correlation is performed on a received signal in step 1810. A measurement of time difference between peaks of the correlation output is performed in step 1820. The symbol timing offset is estimated in step 1830, and that offset is used in order to receive additional digital signals in step 1840.

Figure 19:
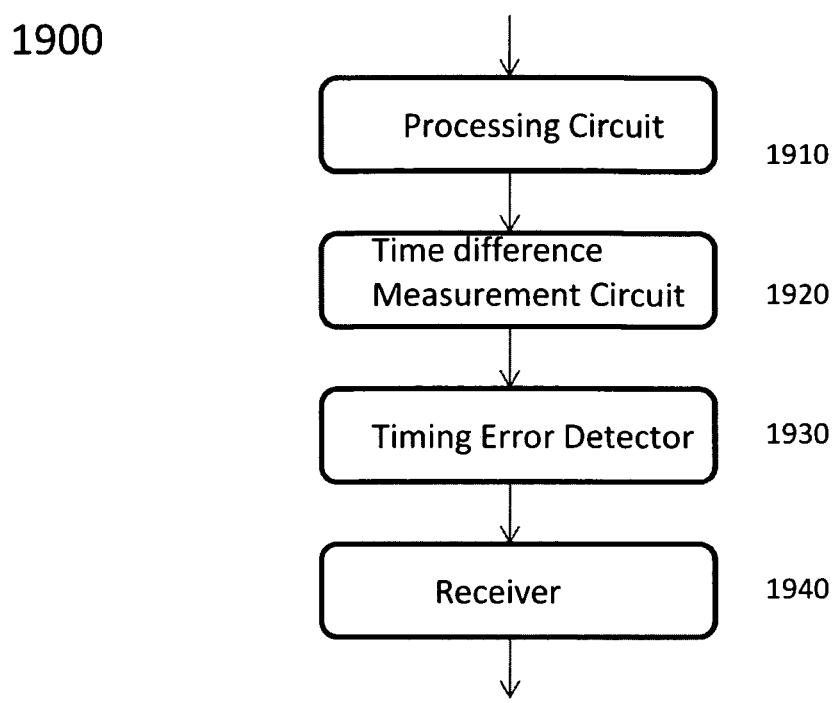
FIG. 19 shows a first exemplary apparatus under the present principles.

Another embodiment of the present principles is illustrated in FIG. 19, which shows a first exemplary apparatus 1900 for symbol timing recovery. A processing circuit 1910 is used for performing one or more differential correlation operations on a received signal. Time difference measurement circuitry 1920 calculates the time difference between peak values of the correlation output. A Timing Error Detector (TED) 1930 determines a coarse symbol timing using the time difference from the measurement circuitry 1920. A receiver 1940 inputs subsequent digital signals using the coarse symbol timing for synchronization.

Figure 20:
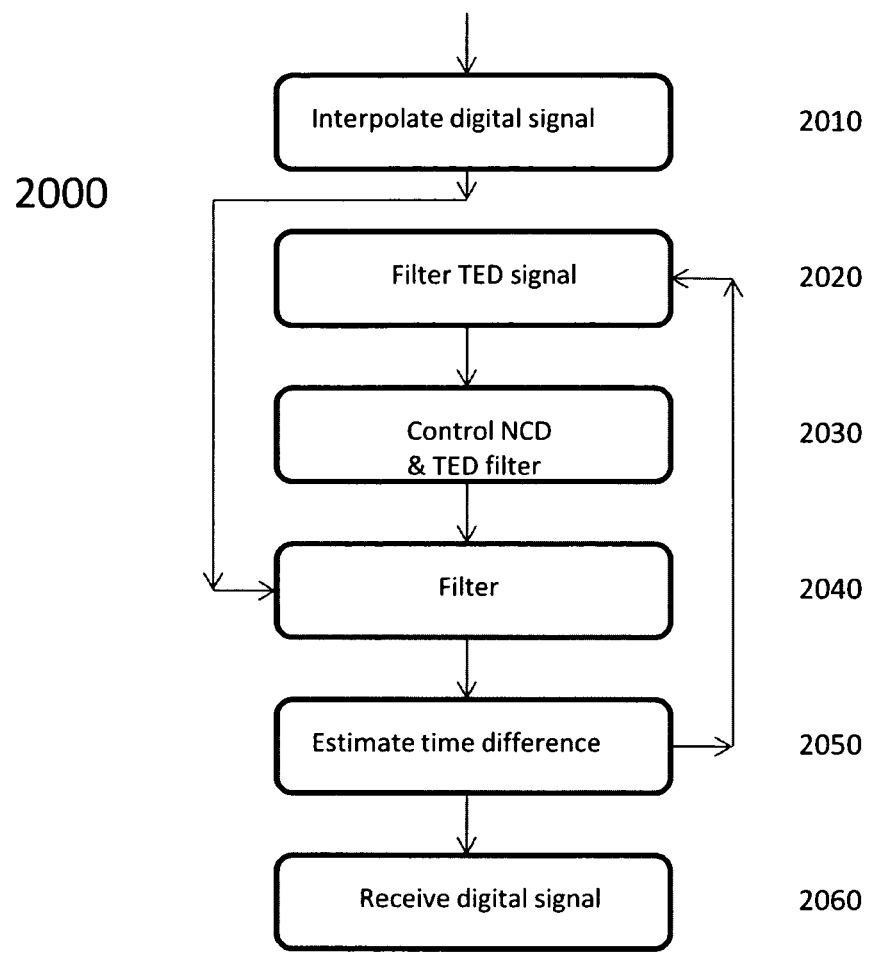
FIG. 20 shows a second exemplary method under the present principles.

Another embodiment of the present principles is illustrated in FIG. 20, which shows a second exemplary method 2000 for symbol timing recovery. A received digital signal is interpolated in step 2010. The interpolated received signal is filtered in step 2040, and a timing error is estimated in step 2050. The timing error signal is filtered in step 2020, and the filtered output is used to control a numerically controlled delay and fed back to the timing error detector filter in step 2030. The timing error signal is also used to receive further digital signals in step 2060.

Figure 21:
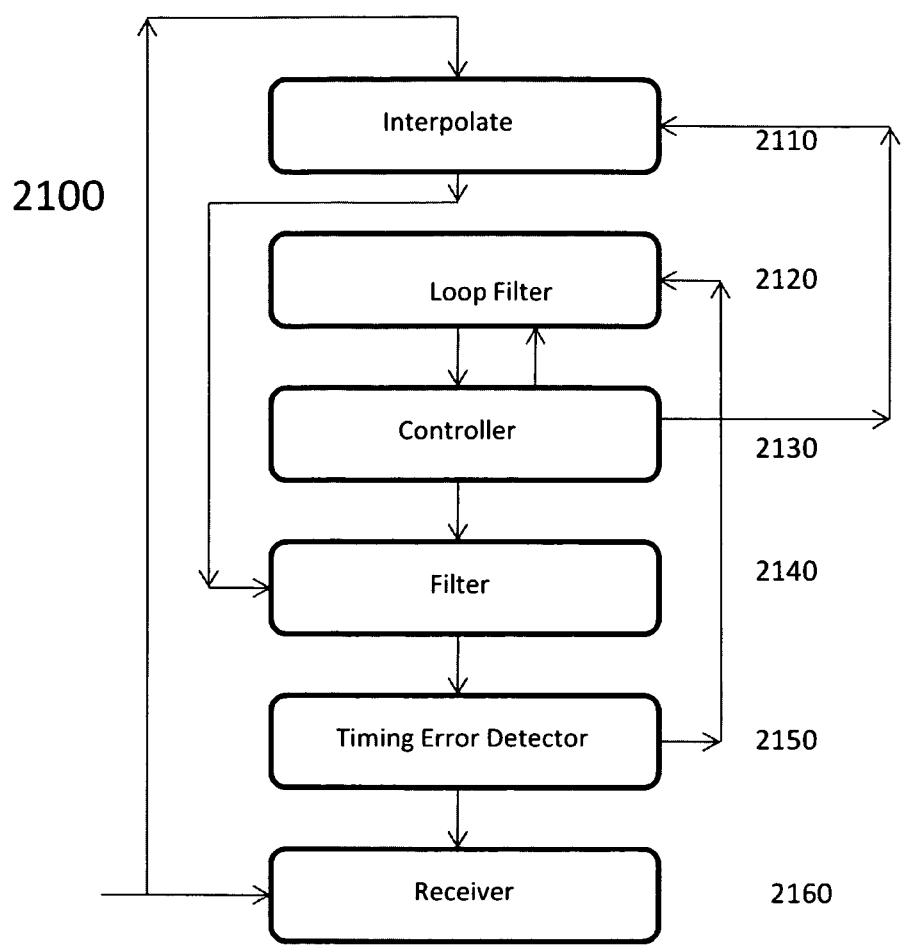
FIG. 21 shows a second exemplary apparatus under the present principles.

Another embodiment of the present principles is illustrated in FIG. 21, which shows a second exemplary apparatus for symbol timing recovery. An interpolator 2110 is used to interpolate a received digital signal and is controlled by a controller 2130. A loop filter 2120 is used to filter a timing error signal and is also controlled by controller 2130. A filter 2140 is used to filter the interpolator 2110 output, and is also controlled by controller 2130. A timing error detector 2150 receives the filtered interpolated received signal and uses a timing error as an estimate of fine symbol timing offset to determine symbol timing, which is used by receiver 2160 for subsequent digital signals.

Figure 22:
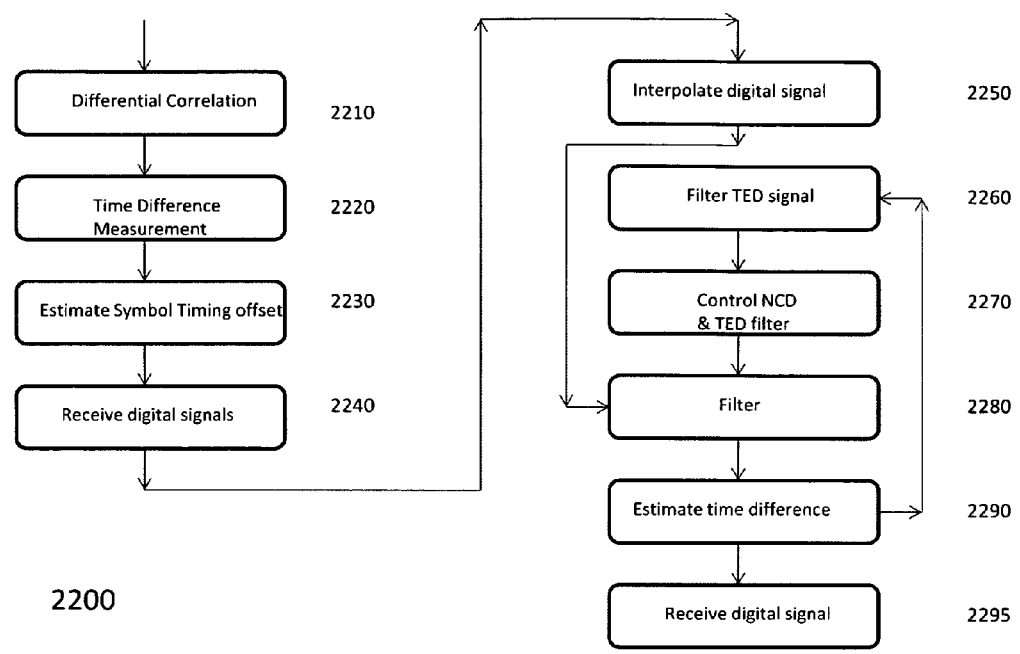
FIG. 22 shows a third exemplary method under the present principles.

Another embodiment of the present principles is illustrated in FIG. 22, which shows a third exemplary method 2200 for symbol timing recovery. Differential correlation is performed on a received signal in step 2210. A measurement of time difference between peaks of the correlation output is performed in step 2220. The coarse symbol timing offset is estimated in step 2230, and that coarse symbol timing offset is used in order to receive further digital signals in step 2240. The further received digital signals are interpolated in step 2250. The interpolated received signal is filtered in step 2280, and a fine timing error is estimated in step 2290. The fine timing error signal is filtered in step 2260, and the filtered output is used to control a numerically controlled delay and fed back to the timing error detector filter in step 2270. The fine timing error signal is also used to receive further digital signals in step 2295.

Figure 23:
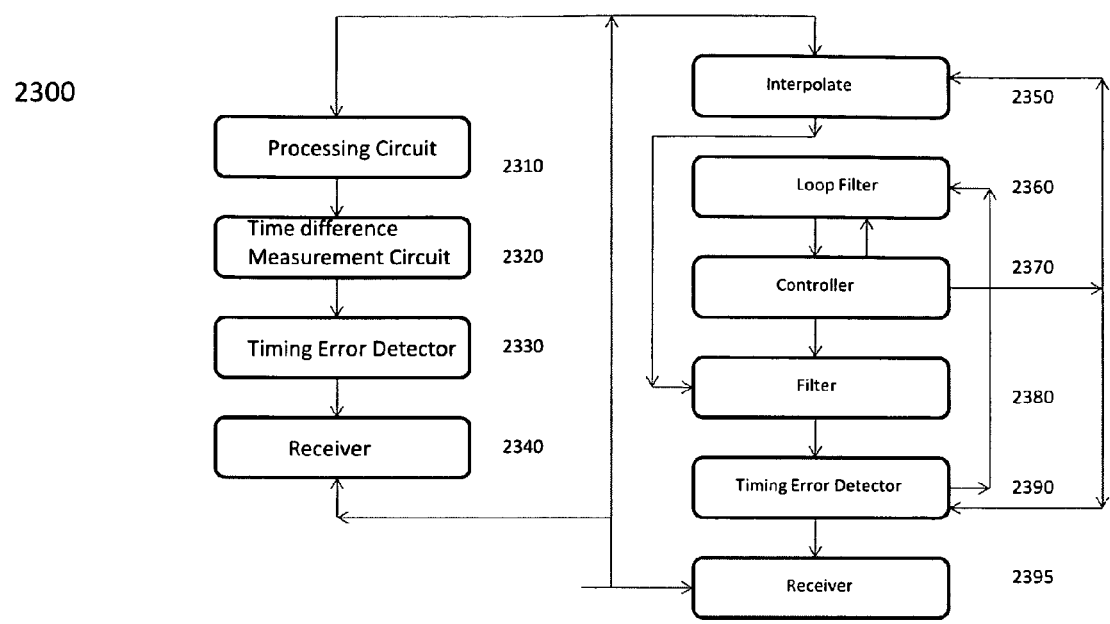
FIG. 23 shows a third exemplary apparatus under the present principles.

Another embodiment of the present principles is illustrated in FIG. 23, which shows a third exemplary apparatus 2300 for symbol timing recovery. A processing circuit 2310 is used for performing one or more differential correlation operations on a received signal. Time difference measurement circuitry 2320 calculates the time difference between peak values of the correlation output. A Timing Error Detector (TED) 2330 determines a coarse symbol timing using the time difference from the measurement circuitry 2320. A receiver 2340 inputs further received digital signals using the coarse symbol timing for synchronization. An interpolator 2350 is used to interpolate the further received digital signal and is controlled by a controller 2370. A loop filter 2360 is used to filter a timing error signal and is also controlled by controller 2370. A filter 2380 is used to filter the interpolator 2350 output, and is also controlled by controller 2370. A timing error detector 2390 receives the filtered interpolated received signal and uses a timing error as an estimate of fine symbol timing offset to determine symbol timing, which is used by receiver 2395 for subsequent digital signals.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

A description will now be given of the many attendant advantages and features of the present principles, some of which have been described above. For example, a method of symbol timing recovery that performs one or more differential correlation operations on a received digital signal, measures the time difference between correlation peak values, uses that difference to estimate symbol timing offset as a basis for coarse symbol timing. Another feature is performing the above method on a signal having repeated known symbols. Another feature is that same method described above wherein the correlation operation is performed twice. Another feature is that same method described above using a data aided feed forward symbol recovery method using known synchronization symbols embedded in a signal. Yet a further feature is an apparatus to perform the methods described above, comprising a processing circuit for performing the one or more differential correlation operations, time difference measurement circuitry for measuring the time difference between correlation peaks, a timing error detector for determining a coarse symbol timing and a receiver for receiving further digital signals using the coarse symbol timing. Another feature is the apparatus above, but wherein the processing circuit performs correlation on a signal having repeated known symbols. Another feature is the apparatus above, wherein the processing circuit performs correlation twice. Another feature is the apparatus above, wherein the processing circuit performs the correlation operation by using a data aided feed forward symbol timing recovery method using known synchronization signals embedded in a signal.

Another feature of the present principles is a method of improved symbol timing recovery wherein a received digital signal is interpolated through control of a numerically controlled delay, filtered using at least one of a matched filter or a second filter, and used to find the timing error for fine symbol timing, which is then filtered and used by the numerically controlled delay for symbol timing. Another feature is the above method wherein the timing error is filtered by a moving time average filter prior to filtering by the loop filter. Another feature is the above method wherein an iteration counter is used to determine an acquisition time and a tracking time. Another feature is the above method wherein the interpolated output is filtered by a second filter during acquisition phase and filtered by a matched filter during a tracking phase. Another feature is the above method wherein the interpolated output is unfiltered during an acquisition phase and filtered by a matched filter during a tracking phase. Another feature is the above method wherein a low delay matched filter is used for timing recovery and a different matched filter is used for data. Yet another feature is an apparatus to perform the above method, comprising an interpolator for interpolating a received digital signal, wherein interpolating is controlled by a numerically controlled delay, a loop filter for filtering a time difference signal, a controller for controlling the numerically controlled delay using output of the loop filter, another filter for filtering the interpolated output using at least one of a matched filter or a second filter, wherein the second filter can also be a matched filter, a timing error detector for using the time difference signal as an estimate of symbol timing offset to determine symbol timing, and a receiver for receiving a further digital signal using the fine symbol timing. Another feature is the above apparatus wherein the timing error is filtered by a moving time average filter prior to filtering by the loop filter. Another feature is the above apparatus wherein an iteration counter is used to determine an acquisition time and a tracking time. Another feature is the above apparatus wherein the interpolated output is filtered by a second filter during acquisition phase and filtered by a matched filter during a tracking phase. Another feature is the above apparatus wherein the interpolated output is unfiltered during an acquisition phase and filtered by a matched filter during a tracking phase. Another feature is the above apparatus wherein a low delay matched filter is used for timing recovery and a different matched filter is used for data.

Another feature of the present principles is a method of symbol timing recovery comprising performing one or more differential correlation operations on a received signal, measuring a time difference between peak values of the correlation function, using the time difference as an estimate of symbol timing offset to determine a coarse symbol timing, using said coarse symbol timing to receive a further digital signal, interpolating further received digital signal, wherein interpolating is controlled by a numerically controlled delay, filtering a timing error detection signal with a loop filter, controlling the numerically controlled delay using output of said loop filter, filtering of the interpolated output using at least one of a matched filter or a second filter, wherein the second filter can also be a matched filter, finding the timing error of the filtered interpolated signal as a further estimate of symbol timing offset to determine a fine symbol timing, and using said fine symbol timing to receive a subsequent digital signal.

Yet another feature is an apparatus to perform the above method comprising a processing circuit for performing one or more differential correlation operations on a received signal, circuitry for measuring a time difference between peak values of the correlation function, a timing error detector for determining coarse symbol timing using the time difference as an estimate of symbol timing offset, a receiver for receiving a further digital signal using said coarse symbol timing, an interpolator for interpolating said further received digital signal, wherein interpolating is controlled by a numerically controlled delay, a loop filter for filtering a time difference signal, a controller for controlling the numerically controlled delay using output of said loop filter, a filter for filtering the interpolated output using at least one of a matched filter or a second filter, wherein the second filter can also be a matched filter, a timing error detector for calculating the timing error of the filtered interpolated signal as an estimate of symbol timing offset to determine the symbol timing, and a receiver for receiving a subsequent digital signal using said fine symbol timing.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method of symbol timing recovery, comprising:
performing one or more differential correlation operations on a received signal at the sample rate, wherein the correlation operation is performed by using a data aided feed forward symbol timing recovery method using known synchronization symbols embedded in a signal;
measuring a time difference between peak values of the correlation function;
using the time difference as an estimate of symbol timing offset to determine a coarse symbol timing; and
receiving a further digital signal using said coarse symbol timing.

2. The method of claim 1, wherein the correlation operation is performed on a signal having repeated known symbols.

3. The method of claim 1, wherein the correlation operation is performed twice.

4. An apparatus for symbol timing recovery, comprising:
a processing circuit for performing one or more differential correlation operations on a received signal at the sample rate, wherein the correlation operation is performed by using a data aided feed forward symbol timing recovery method using known synchronization symbols embedded in a signal;
circuitry for measuring a time difference between peak values of the correlation function;
a timing error detector for determining coarse symbol timing using the time difference as an estimate of symbol timing offset; and
a receiver for receiving a further digital signal using said coarse symbol timing.

5. The apparatus of claim 4, wherein the correlation operation is performed on a signal having repeated known symbols.

6. The apparatus of claim 4, wherein the correlation operation is performed twice.

7. A method of improved symbol timing recovery, comprising:
interpolating a received digital signal, wherein interpolating is controlled by a numerically controlled delay;
filtering a timing error detection signal with a loop filter;
controlling the numerically controlled delay using output of said loop filter
filtering of the interpolated signal using one of a first filter and a second filter, wherein the first filter is a prefilter and the second filter is a matched filter followed by said prefilter, and wherein the first filter is used during an acquisition phase and the second filter is used during a tracking phase;
finding a timing error of said filtered interpolated signal as an estimate of fine symbol timing offset to determine symbol timing;
receiving a further digital signal using said fine symbol timing.

8. The method of claim 7, wherein the output time difference is filtered with a Moving Time Average filter before said loop filter.

9. The method of claim 7, wherein an iteration counter is used to determine an acquisition time and a tracking time.

10. The method of claim 9, wherein a low delay matched filter is used for timing recovery and a different matched filter is used for data.

11. An apparatus for improved symbol timing recovery, comprising:
an interpolator for interpolating a received digital signal, wherein interpolating is controlled by a numerically controlled delay;
a loop filter for filtering a time difference signal;
a controller for controlling the numerically controlled delay using output of said loop filter;
a filter for filtering of the interpolated signal using one of a first filter and a second filter, wherein the first filter is a prefilter and the second filter is a matched filter followed by said prefilter, and wherein the first filter is used during an acquisition phase and the second filter is used during a tracking phase;

a timing error detector for finding the timing error as an estimate of symbol timing offset to determine symbol timing;

a receiver for receiving a further digital signal using said fine symbol timing.

12. The apparatus of claim 11, wherein the output time difference is filtered with a Moving Time Average filter before said loop filter.

13. The apparatus of claim 11, wherein an iteration counter is used to determine an acquisition time and a tracking time.

14. The apparatus of claim 13, wherein a low delay matched filter is used for timing recovery and a different matched filter is used for data.

15. A method of symbol timing recovery, comprising:
performing one or more differential correlation operations on a received signal;
measuring a time difference between peak values of the correlation function;
using the time difference as an estimate of symbol timing offset to determine a coarse symbol timing;
using said coarse symbol timing to receive a further digital signal;
interpolating further received digital signal, wherein interpolating is controlled by a numerically controlled delay;
filtering a timing error detection signal with a loop filter;
controlling the numerically controlled delay using output of said loop filter
filtering of the interpolated output using one of a first filter and a second filter, wherein the first filter is a prefilter and the second filter is a matched filter followed by said prefilter, and wherein the first filter is used during an acquisition phase and the second filter is used during a tracking phase;
finding the timing error of the filtered interpolated signal as a further estimate of symbol timing offset to determine a fine symbol timing;
using said fine symbol timing to receive a subsequent digital signal.

16. An apparatus for symbol timing recovery, comprising:
a processing circuit for performing one or more differential correlation operations on a received signal;
circuitry for measuring a time difference between peak values of the correlation function;
a first timing error detector for determining coarse symbol timing using the time difference as an estimate of symbol timing offset;
a receiver for receiving a further digital signal using said coarse symbol timing;
an interpolator for interpolating said further received digital signal, wherein interpolating is controlled by a numerically controlled delay;
a loop filter for filtering a time difference signal;
a controller for controlling the numerically controlled delay using output of said loop filter;
a filter for filtering the interpolated output using one of a first filter and a second filter, wherein the first filter is a prefilter and the second filter is a matched filter followed by said prefilter, and wherein the first filter is used during an acquisition phase and the second filter is used during a tracking phase;
a second timing error detector for calculating the timing error of the filtered interpolated signal as an estimate of symbol timing offset to determine the symbol timing;
a receiver for receiving a subsequent digital signal using said fine symbol timing.

* * * * *